(12) United States Patent
Graf

(10) Patent No.: US 9,096,023 B2
(45) Date of Patent: Aug. 4, 2015

(54) SYSTEM FOR PRODUCING FIBER-REINFORCED MOLDED PARTS AND METHOD FOR OPERATING A SYSTEM FOR PRODUCING FIBER-REINFORCED MOLDED PARTS

(75) Inventor: Matthias Graf, Bretten (DE)

(73) Assignee: DIEFFENBACHER GMBH MASCHINEN-UND ANLAGENBAU, Eppingen (DE)

( * ) Notice: Subject to any disclaimer, the term of this patent is extended or adjusted under 35 U.S.C. 154(b) by 535 days.

(21) Appl. No.: 13/509,587

(22) PCT Filed: Nov. 12, 2010

(86) PCT No.: PCT/EP2010/006918
§ 371 (c)(1),
(2), (4) Date: Jul. 23, 2012

(87) PCT Pub. No.: WO2011/057807
PCT Pub. Date: May 19, 2011

(65) Prior Publication Data
US 2012/0273989 A1  Nov. 1, 2012

(30) Foreign Application Priority Data

Nov. 12, 2009  (DE) .......................... 10 2009 046 670

(51) Int. Cl.
| | | |
|---|---|---|
| *B29C 69/02* | (2006.01) | |
| *B29C 70/50* | (2006.01) | |
| *B29B 15/12* | (2006.01) | |
| *B29C 31/06* | (2006.01) | |
| *B29C 31/08* | (2006.01) | |
| *B29C 70/46* | (2006.01) | |
| *B29C 70/54* | (2006.01) | |

(52) U.S. Cl.
CPC ............. *B29C 70/504* (2013.01); *B29B 15/122* (2013.01); *B29C 31/066* (2013.01); *B29C 31/08* (2013.01); *B29C 70/46* (2013.01); *B29C 70/54* (2013.01)

(58) Field of Classification Search
CPC ...... B29B 15/122; B29C 70/46; B29C 70/50; B29C 70/504; B29C 70/54; B29C 70/56
USPC .............. 264/119, 235, 235.6, 236, 157, 160, 264/320, 325, 145, 134, 135, 136, 137; 425/122, 224, 115, 145, 296, 297
See application file for complete search history.

(56) References Cited

U.S. PATENT DOCUMENTS

| | | | | |
|---|---|---|---|---|
| 4,771,880 | A | * | 9/1988 | Mraz .............................. 198/812 |
| 7,354,540 | B2 | * | 4/2008 | Brussel ......................... 264/113 |

FOREIGN PATENT DOCUMENTS

| | | |
|---|---|---|
| EP | 1 386 721 A1 | 2/2004 |
| FR | 1324495 A | 4/1963 |

(Continued)

OTHER PUBLICATIONS

Machine translation of WO-90/06226 (Behar) Jun. 14, 1990.*

(Continued)

*Primary Examiner* — Timothy Kennedy
(74) *Attorney, Agent, or Firm* — Foley & Lardner LLP

(57) ABSTRACT

A system for the continuous production of fiber-reinforced resin sheets during the production of fiber-reinforced molded parts by extrusion in a molding press, wherein a production device for producing resin sheets, comprising a mixing device for combining at least one resin base having fibers and a fulling and saturating device for mixing the fibers with the resin base into a resin sheet is arranged in succession, a thickening device is arranged for maturation of the resin sheet and a transfer device is arranged for cutting the resin sheet to length to a cut sheet for subsequent transfer of at least one cut sheet to the molding press; in the thickening device there is a transport section between the inlet point of the resin sheet into and an outlet point of the resin sheet out of the thickening device. At least one positioning device is arranged substantially within the thickening device.

19 Claims, 6 Drawing Sheets

(56) References Cited

FOREIGN PATENT DOCUMENTS

Figure 1:
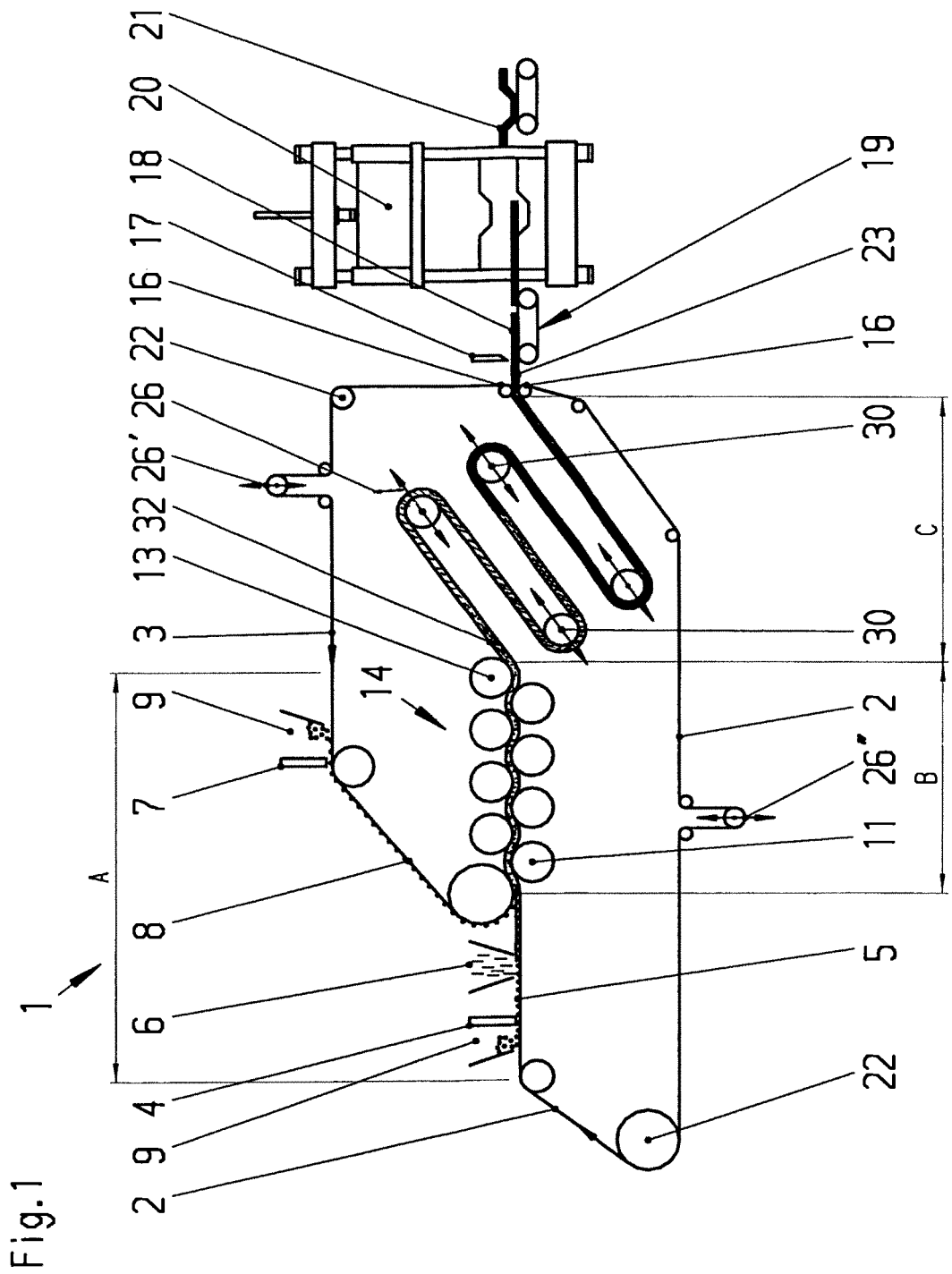

| | | |
|---|---|---|
| JP | 4135704 A | 5/1992 |
| WO | WO-90/06226 A1 | 6/1990 |

OTHER PUBLICATIONS

International Search Report dated Mar. 31, 2011 as received in corresponding PCT Application No. PCT/EP2010/006918, 6 pages.

* cited by examiner

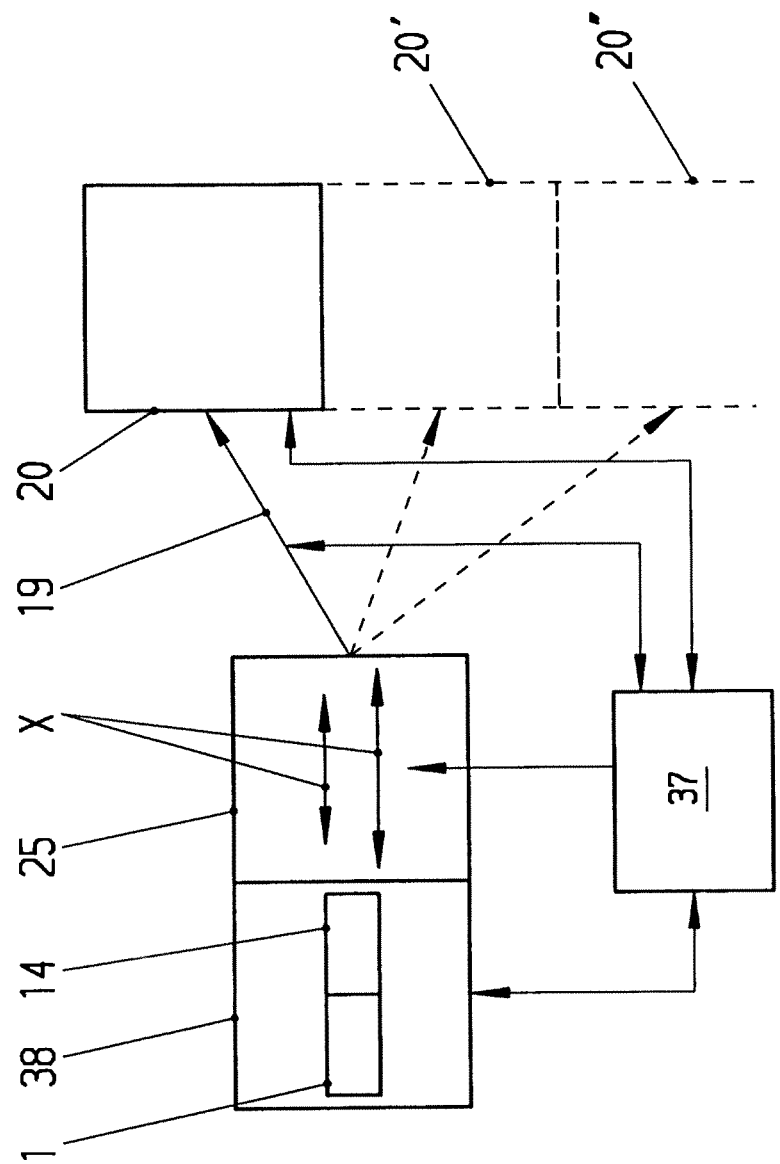

SYSTEM FOR PRODUCING FIBER-REINFORCED MOLDED PARTS AND METHOD FOR OPERATING A SYSTEM FOR PRODUCING FIBER-REINFORCED MOLDED PARTS

CROSS REFERENCE TO RELATED APPLICATIONS

The present application is a National Stage of International Application No. PCT/EP2010/006918 filed on Nov. 12, 2010, which claims the benefit of German Patent Application No. 10 2009 046 670.3 filed on Nov. 12, 2009. The entire disclosures of which are incorporated herein by reference.

The invention relates to a facility for producing fiber-reinforced molded parts (sheet-molding compound, SMC), and also relates to a method for operating a facility for producing fiber-reinforced molded parts (SMC).

Because of their good mechanical properties and the favorable price, such molded parts produced according to the SMC method are the most used duroplastic fiber composite plastics. Heretofore, to produce SMC parts, firstly the raw material, consisting of a resin compound (resin formulation) having intercalated chopped glass fibers is produced. This resin formulation is laid on thin transparent plastic films (carrier films) and subjected to a maturing process. The current maturing process lasts 4-5 days and is used for thickening the fillers mixed into the resin formulation. The resin formulation consists of resins, thermoplastic solutions, fillers, flow promoters, integrated parting agents, inhibitors, and curing agents. These are stirred to form a well-dispersed liquid at predefined temperature and also provided at the resin mat facility with a thickener, in powdered or liquid form, and squeegeed onto the lower and upper carrier film via squeegees and set in width. The chopped glass is metered, for example, from endless rovings using cutting mechanisms onto the resin formulation layer of the lower carrier film. The upper carrier film having the resin formulation is then laid on the cut fiber covering. Through a subsequent milling process, the fibers are mixed/impregnated with the resin formulation and subsequently wound as a resin mat onto a roll or temporarily stored as a flat semifinished product for the maturing process. Through the maturing process, the resin formulation thickens so strongly that the carrier films can be drawn off without residue and the glass pressing can accordingly flow with the matrix during the extrusion.

Tailored mats are cut out of the flat semifinished product or the rolls, adapted to the respective molded part to be produced, and laid in a molding press singly or as a packet and compressed. The disadvantage of this method is that the SMC semifinished product can only be processed after a long maturing time, whereby the production costs increase.

Furthermore, it is disadvantageous that the semifinished product wound onto a roll deforms during the maturing process. If the roll lies on the floor, pressing occurs on the SMC webs located on the bottom, and therefore displacement of the material to the side. If the rolls are suspended via an axle, the negative effect during the maturing storage is reversed. The material flows downward and the web layers in the lower area of the roll will have higher weights per unit area than the upper web layers. These necessarily different weights per unit area require that the mats not only be cut according to length but rather additionally weighed, in order to obtain the same filling and therefore part thickness in each manufactured part. If the weights per unit area of the webs were constant, the required SMC web sections could be cut automatically using a length measuring clock, which would significantly reduce the manufacturing costs and improve the quality of the molded parts. This tailored mat composition which differs in the thickness cross-section is also the reason why the production of SMC molded parts has not been able to be satisfactorily automated up to this point.

A method and a facility are known from EP 1 386 721 A1, which was based on the object of providing the resin mats (SMC semifinished product) with the suitable plasticity for an immediately following direct processing into molded parts. Particularly preferably, films are to be dispensed with and the control of the maturing time or the thickening time of the resin mats was substantially performed by the introduction of heat in a temperature-control thickening instantaneous heater. In the meantime, the continuous direct method for producing fiber-reinforced molded parts without intermediate storage of the resin mats for the ensuring process has been implemented in industrial life and has significant advantages in the field of just-in-time production, substantial problems of storage and in particular just-in-time delivery being able to be avoided. It is particularly to be emphasized that the most compact possible facility has been disclosed in EP 1 386 721 A1, in which the temperature-controllable belt carriers were arranged meandering in a housing in a thickening instantaneous heater for a chronologically predefined maturing process, depending on the required length. Through the arrangement of the belt carriers and their embodiment in length and number one over another, the maturing process can be designed having appropriate maturing time.

This facility has fundamentally proven itself, but has a lack of flexibility in highly industrialized operation. This lack of flexibility is displayed, for example, through sluggish temperature control of the thickening instantaneous heater. This arises in particular due to the latent heat storage in the device parts, in particular in the deflection rolls and load-bearing facility parts, which nearly prevents a temperature change within the shortest possible period during a production changeover. The facility also requires substantially too long to reach operating temperature.

In addition to a production changeover, however, there is also the possibility that such a production facility for producing resin mats not only operates one molding press, but rather multiple molding presses. If one of these presses suddenly drops out because of a tool change, need for repair or maintenance, or a lack of workload, the production facility for producing resin mats must suddenly be able to offer another output performance of resin mats. However, limits are placed on typical facilities for this purpose. For example, the throughput time of the resin formulation or the resin mat, respectively, through the thickening instantaneous heater can be reduced. This causes a lower output performance per unit of time, but simultaneously also increases the dwell time in the thickening instantaneous heater. The resin formulation only has a relatively short time window for use in a molding press for direct production, however, so that the possibility exists that in the present example, the increased dwell time in the thickening instantaneous heater will result in complete curing of the resin mat and therefore in unusable material. In the opposing application, resin mats would result which have not yet sufficiently matured.

Alternatively, of course, the quantity of resin formulation to be introduced during the squeegeeing can also be reduced, whereby the production quantity of the resin mats per unit of time is also reduced, which in turn results in excessively rapid maturing in the thickening instantaneous heater because of a lack of compound and possibly in turn produces the resin mats in unusable or at least nearly unusable form. Limits are also placed on the latitude of the resin formulation quantity to be introduced, for example, because, for example, in the case of a high-volume production, too little of the heat introduced arrives in the resin mat or it is not sufficiently deeply acting or, in the case of a low-volume production, the output of the resin formulation through the squeegeeing box is too low and therefore cannot be properly controlled or regulated and/or the wetting of optional glass fiber strands is not properly possible.

The present examples are not intended solely as exclusive examples, because the above possibilities are entirely usable, but fail at latest in the event of excessively strong utilization of possible settable production parameters of the resin mat production facility; in particular, if it is intended for the supply of molding presses utilized to different extents, having possible tool change with different volume and/or time requirements.

The object of the invention comprises providing a facility and a method for operating a facility for producing fiber-reinforced resin mats for the direct production of SMC molded parts, which has substantially greater latitude and simplified facility technology with respect to the possible production quantity per unit of time in relation to the demand over the prior art. In particular in the facility, the object is to be achieved that, in the event of possible lengthening or shortening of the transport route in the area of the resin mat production and/or the maturing of the resin mat, the exit point of the resin mat is arranged locally at the same location.

The achievement of the object for a facility is that to vary the transport route between the entry point and the exit point (of the thickening device), at least one positioning device is arranged substantially inside the thickening device.

The achievement of the object for the method is that by means of at least one control device, which is operationally linked for control and/or regulation to at least one molding press, at least one transfer device, a thickening device, and a production device for preparing an endless resin mat, the output quantity of the resin mats is adapted to the required demand of the molding press.

It is advantageously now possible using the facility or the method according to the invention to produce resin mats for direct use,
  either multiple molding presses being able to be operated, greatly varying tools (with respect to volume and/or time) being able to be used, or
  extremely highly reactive resin formulations being able to be used, which have a small time window for the compression.

It is presumed that the supply of resin formulation for squeegeeing onto films or conveyor belts is fundamentally ensured, it is either delivered in an appropriate quantity or produced on location using suitable production devices.

The above-mentioned advantages are particularly decisive if multiple molding presses are arranged as a whole in a production facility for SMC components. In particular, it is preferred that a complete and automated controller of the entire facility made of at least one resin mat production and at least one molding press having a transfer device interconnected between these two main elements is arranged. The individual elements are interconnected and controlled with respect to the method in such a manner that production interruptions or maintenance work in the molding presses can be automatically controlled so that the transfer device and/or the responsible facility part for the production of the resin mats ensures the provision of the resin mats to the molding presses in an optimized manner, depending on the required demand.

It is intrinsic to the molding press or its tools that a minimum cleaning of the tool is provided for all above-described compressions. Furthermore, there are maintenance intervals, which also occur at regular intervals, but only last a few minutes. The control device controls the resin mat production in such a manner that depending on the requirement of resin mats to be expected, the required number of resin mats can always be transferred by the press controllers.

The control device simultaneously prevents excess production of resin mats, which cannot be processed, from arising because of the maintenance or cleaning intervals.

Using the solution according to the invention, the production facility can react optimally to production changeovers and must no longer make do with the variation of the belt speed and the output volume of the resin mats themselves. In an expanded object, it is made possible in particular to substantially maintain the exit point of the resin mats from the facility, so that spatial changes between the exit point and the following facilities such as molding presses, transfer devices, or the like are not necessary. In particular it is now possible to change an essential parameter of the maturing of the resin mats which has previously been neglected in the prior art, the maturing section itself. The change of this parameter is preferably performed independently of the other parameters.

Alternatively, in this context, at least one additional parameter, in particular the heat introduction into the resin mat during the maturing, can be changed. A microwave arrangement is particularly preferably used in this context, which can introduce the heat introduced into the resin mat independently of the storing or guiding belts, respectively. Heat transfer by convection is entirely within the scope of what is possible and typical, but high-quality belts for the transport of the resin mats, in particular if films are not used, typically have very good insulating properties.

Moreover, it is not absolutely necessary for the resin mats to be conveyed by means of conveyor belts or tables in the facility. In particular in the thickening section, it can be possible to dispense with the use of films on belts, because with correspondingly thick films, the films assume the tasks of the belts and in particular lead through the thickening device or section. Support devices, such as support tables, are then preferably arranged between the deflection rolls, preferably so they can telescope or fold in their length or support surface for the belts or films having the resin mats by means of suitable devices.

It is also conceivable that a part of the thickening section is fixed and a second part of the thickening section is variable in length, so that in particular in large facilities, the thickening section preferably consists of two devices when considered physically, a fixed and an extendable thickening section or device, respectively.

With respect to the transfer device, it is to be noted that it can essentially consist of multiple functional facility parts, which do not need to be explained or presented in greater detail, because not all possible variants of facility types or variations can be claimed. However, as defined in the invention, the transfer device comprises the region from the exit point of the resin mat out of the area of the resin mat production. This exit point is preferably identical to the main maturing time of the resin mat. However, in the nature of the resin mat, this point in time is dependent on many factors, and there is rather a main maturing time window here, which is defined by the points in time "earliest possible processing" and "latest processing". The times lying outside the main maturing time window result in either immature or overmature resin mats which essentially can no longer be compressed. With respect to the latest processing, of course, time must still allowed for the transfer device or up to the introduction into the molding press. A transfer device preferably consists of a cutting device, a possibly required device for drawing off the optional films from the resin mats, a device for assembling a resin mat formation from one or more resin mats, a device for transporting the resin mats/formation to one or more molding presses, and a corresponding transfer device for transferring the resin mats/formation into a molding press. The mentioned fibers are preferably chopped glass made of rovings and/or long fibers or short fibers to improve the stiffness of the SMC molded part.

With respect to the definition of the entry and exit points, it is to be noted that they are essentially arranged inside the thickening device, however, these points can each extend if needed up to the end of an upstream device, such as the milling and impregnation device, and/or up to a downstream device, such as the cutting device.

As an advantage and result of all method steps and features of the facility according to the invention, fiber-reinforced tailored mats having the correct plasticity can be supplied into an SMC direct method for further processing to form fiber-reinforced duroplastic molded parts, i.e., the SMC direct method according to the invention is capable of providing highly reproducible long-fiber-reinforced duroplastic materials to the processor.

Further advantageous measures and embodiments of the subject matter of the invention are disclosed in the subclaims and the following description with the drawing.

Figure 2:
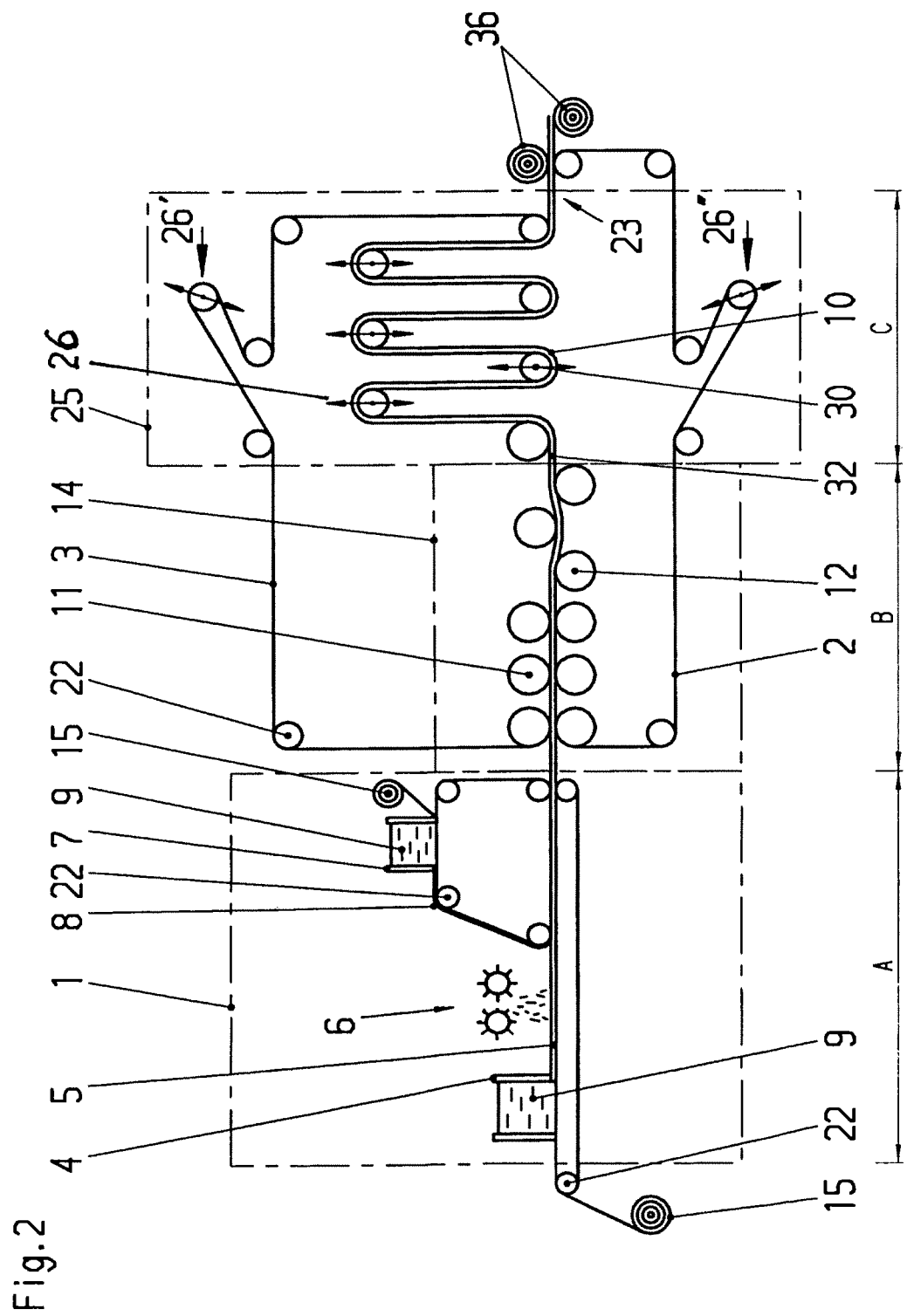
Figure 3:
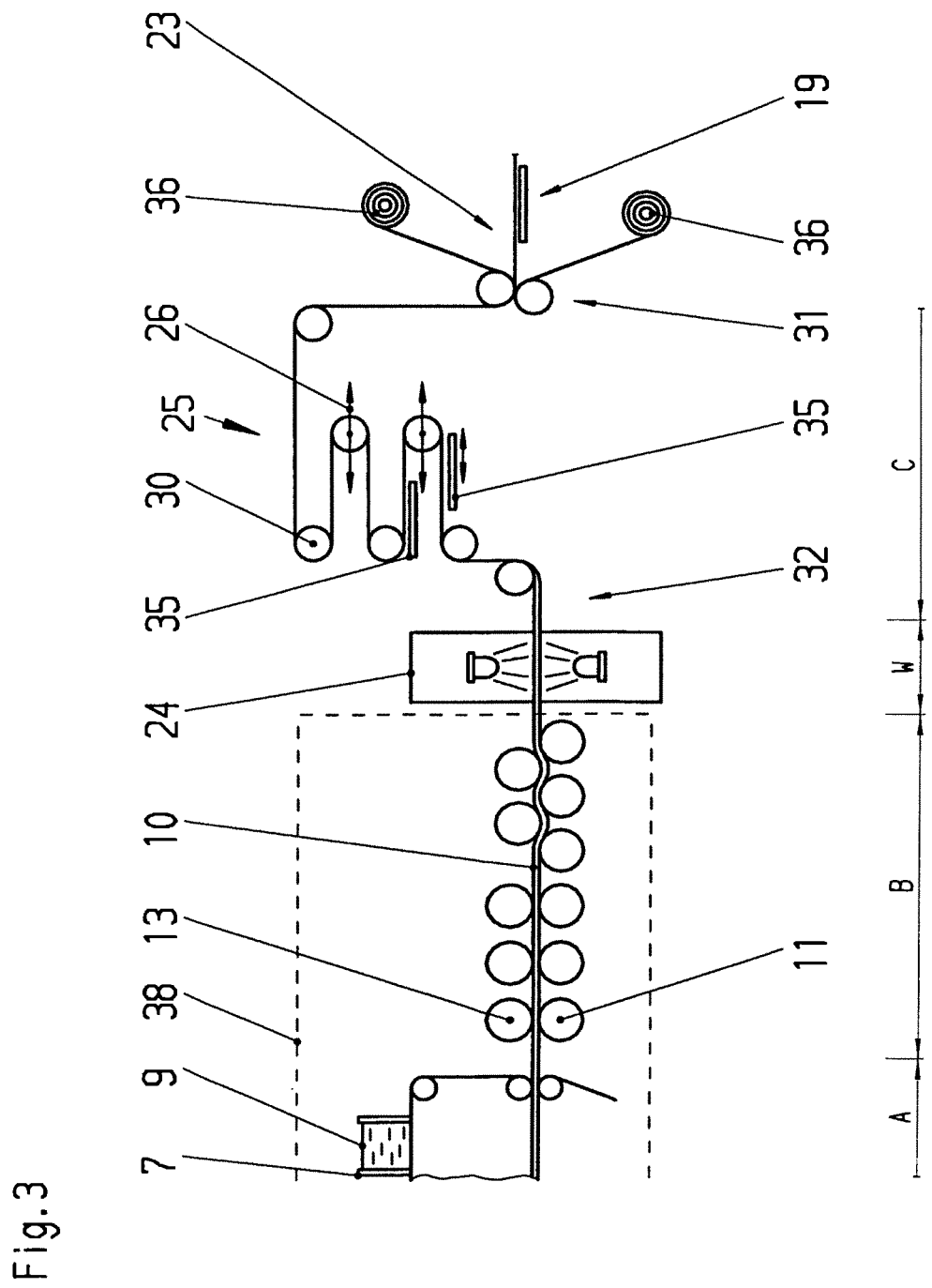
Figure 4:
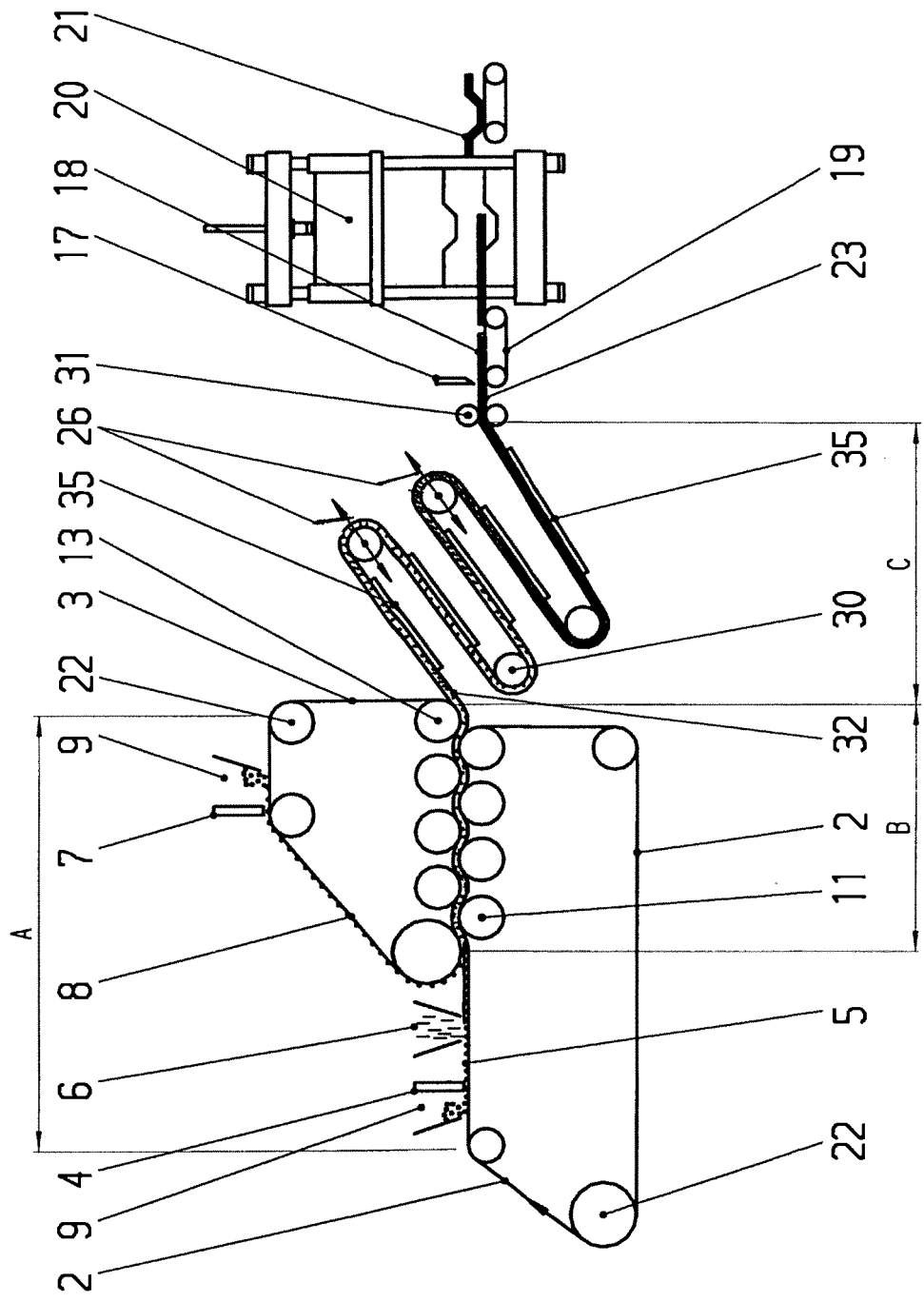
Figure 5:
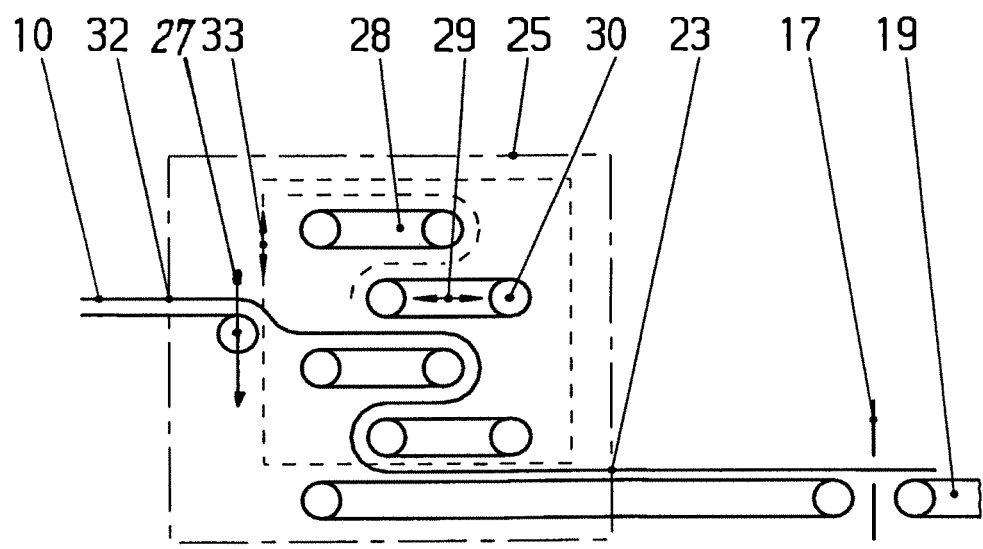
Figure 6:
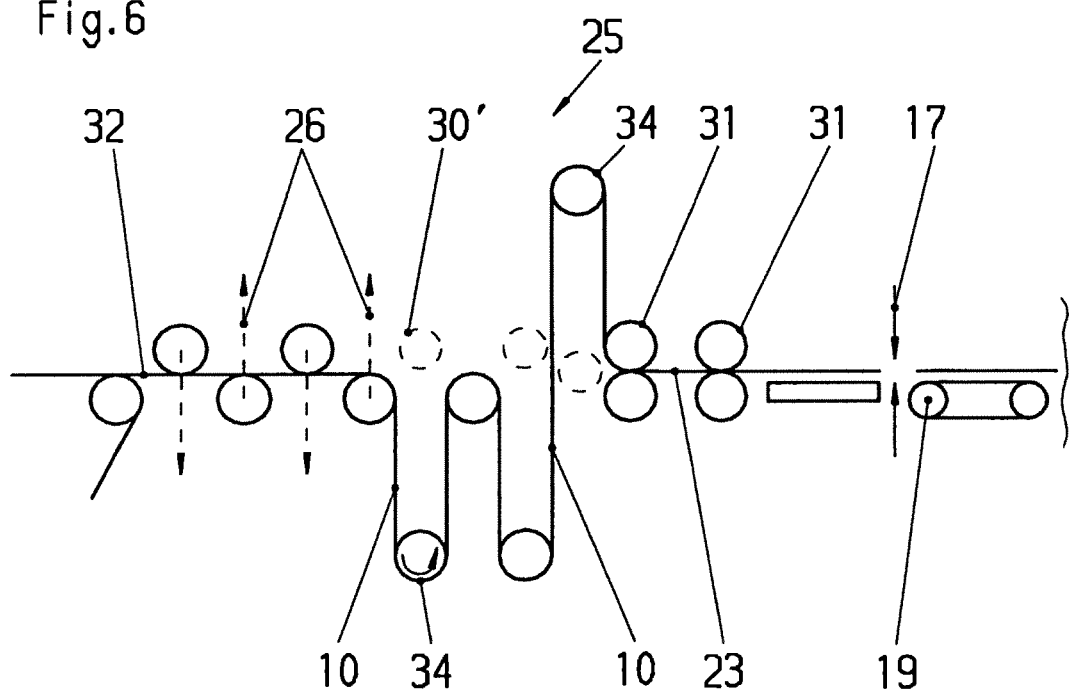

In the figures:

FIG. 1 shows an exemplary facility for the continuous production of fiber-reinforced resin mats in the course of the production of fiber-reinforced molded parts by means of extrusion in a molding press in a schematic side view having a production direction from left to right, the resin mats being produced between two endless belts without films interposed, the transport route in the thickening device being implemented essentially in an angled plane to the vertical or horizontal plane, FIG. 2 shows an exemplary initial facility part in a schematic side view according to FIG. 1, the resin mats being produced between two films and being guided by means of multiple endless belts and the transport route in the thickening device being implemented as essentially vertical, FIG. 3 shows an exemplary part of the facility having a heating device arranged between the production device for resin mats and the thickening device, the resin mat being deflected and guided in the thickening device essentially in the horizontal plane on deflection rolls, FIG. 4 shows a variant of the facility according to FIG. 1, the resin mat being guided between films through the thickening device and support tables being arranged between the deflection rolls to support the resin mat, FIG. 5 shows a detail part of a possible thickening device consisting of multiple belt tablets, which are arranged as horizontally and/or vertically movable to set the transport route, the transfer device of the resin mat also optionally being able to be arranged as vertically adjustable in the thickening device, FIG. 6 shows a further detail part of a possible variable transport route in a thickening device having a plurality of adjustable deflection rolls, and FIG. 7 shows a schematic illustration of a control and/or regulating device having a minimum-required linkage of the individual facility parts for implementing a conceivable method for operating such a facility.

FIG. 1 shows a facility, which is capable of performing the method but can also be operated independently, in a side view. It consists, for producing fiber-reinforced molded parts (SMC) by means of extrusion, in its prominent parts of a mixing device 1 having a resin formulation application section A, the milling and impregnation section B, and the thickening area C. A mixing station for the mixing of the individual components or a metering bin for the resin formulation 9 are not shown. The facility according to FIG. 1 shows that disposable films are not used in the mixing device 1, the milling and impregnation device 14, and in the thickening instantaneous heater 25, but rather two reusable, endless belts 2 and 3, which guide the resin mat 10 via deflection rolls 22 through these facility parts. The premixed resin formulation 9 is first squeegeed using the squeegee 4 onto the lower belt 2 to form the resin formulation layer 5. Fibers 6 made of chopped glass or long or short fibers are then metered onto this lower resin formulation layer 5. Endless fibers or fiber mats can also be inlaid, in particular for load-bearing parts. Simultaneously, the resin formulation layer 8 is squeegeed by means of the squeegee 7 onto the upper belt 3. After the two resin formulation layers 5 (having the fibers 6) and 8 are brought together and are introduced between the lower and upper rollers 11 and 13, the resin mat 10 is molded in the milling and impregnation section B (milling and impregnation device 14), the fibers 6 being impregnated and milled together with the resin formulation 9. The endless resin mat 10 thus molded is then guided by means of deflection rolls 30, preferably driven, always pressing against the belts 2 and 3, through a thickening device 25 for maturing. The transport route X of the thickening area C in the thickening device 25 is essentially defined by the entry point 32 into the thickening device 25 and the exit point 23 at or shortly before a cutting mechanism 17. An illustration of the transport route "X" would have resulted in an illustrative overload of schematic FIGS. 1 to 6, so that the transport route is only shown in its variable shape in abstract form in FIG. 7. If the resin mat 10 is mature, it is detached from the belts 2 and 3 by the cutter strips 16 and supplied to the cutting mechanism 17, preferably associated with a transfer device 19. In the cutting mechanism 17, the resin mat 10 is cut in length and/or in width as specified, and supplied by means of transfer means arranged in the transfer device 19, a transport belt here, as a tailored mat 18 to the molding press 20 and compressed and cured in the molding press 20 to form the molded part 21. If the transport route X is to be varied in its length, the deflection rolls 30 are adjusted in their distance to one another by means of a positioning device 26. In order to still keep the belts 2 and 3 in a tensioned state in the facility, the upper belt 3 is tracked or additionally tensioned by means of a positioning device 26' outside the thickening device in accordance with the change of the deflection rolls 30. This is similarly performed for the lower belt 2 by means of the positioning device 26".

FIG. 2 shows an exemplary initial facility part in a schematic side view according to FIG. 1. A difference is that the resin formulation layers 5 and 8 are formed by means of the squeegees 4 and 7 via two film draw-off units 15 on the top and bottom on conveyor belts in the mixing section A of the mixing device 1. Because of the films, it is possible to separate the individual facility parts from one another. In addition to a conceivable further interface and transfer of the resin mat 10 after the milling and impregnation device 14, the illustrated variant is also advisable, in which the resin mat 10 is again guided in two circulating belts 2 and 3. The adjustment of the transport route X is again implemented similarly as in FIG. 1 by means of the positioning devices 26, 26', and 26", one or a plurality of deflection rolls being arranged to be adjustable. After the exit point 23, the films are drawn off of the resin mat 10 by means of two film winders 36, preferably before the transfer device 19, because the resin mat only still has slightly sticky surfaces after the maturing. The transfer of so-called prepregs is known prior art and does not have to be discussed in greater detail here. It is noteworthy that the belts 2 and 3 are guided essentially vertically and the positioning devices 26 are arranged operating essentially vertically.

FIG. 3 shows a further alternative of the facility having a heating device 24 arranged between the production device 38 for an endless resin mat 10 and the thickening device 25, the resin mat 10 being deflected and guided in the thickening device 25 essentially in horizontal planes on deflection rolls 30. The heating device 24 is preferably implemented as a microwave or high-frequency heater, but conventional convection heaters or heat tunnels are also conceivable in the area of the heat introduction section W.

In order to prevent sagging of the resin mat 10 guided in films, support tables 35 are arranged in parts of the transport route between the entry point 32 and the exit point 23. The support tables 35 can be arranged as telescoping and/or movable by means of suitable positioning devices. The support tables 35 preferably have a low-friction surface on the side of the films or the resin mat 10, respectively. In addition to the driven deflection rolls, which are required depending on the route length of the transport route, a draw-off roller pair 31 can be arranged, preferably having a ribbed or high-friction surface, which holds the resin mat 10 under tension in the thickening area C and can simultaneously support the film winder 36. The draw-off roller pair 31 simultaneously prevents appearances of detachment of the films from the resin mat from occurring up into the thickening area C, if this area is arranged directly after the draw-off roller pair 31.

FIG. 4 shows a variant of the facility according to FIGS. 1 and 2, the resin mat 10 only being guided between films through the thickening device 25. This arrangement has advantages in the respect that in this case a stricter separation of the facility parts of the production device 38 for the resin mats 10 from the thickening device 25 for maturing the resin mats 10 is ensured. In this regard, in relation to the facilities proposed above, it is not necessary to provide its additional positioning devices 26' . . . , because solely through the adjustment of the positioning devices 26 of the deflection rolls 30, extension or shortening of the transport route X is possible without problems. In a preferred embodiment, the support tables 35 arranged here for support and/or the deflection rolls 30 are implemented as heated. The heating of the individual devices is preferably set by a central control device and is then accordingly dependent on the output power of the thickening device required in the case of the demand. In the present example, of course, the output of resin mats 10 from the thickening device 25 is decreased at the moment at which at least one deflection roll 30 increases the distance to the adjacent deflection roll 30 through the positioning device 26. This preferably does not occur suddenly, but rather is adapted to the general production speed of the upstream production device 38.

To illustrate a possible method principle, a central control device 37 is arranged as follows, which preferably has control and regulating capabilities. A conceivable control circuit is that the typical demand for tailored mats 18 or the quantity of endless resin mat 10 per unit of time, respectively, is ascertained as the reference variable, for example, in a press over 100 pressing cycles. If the press respectively requires one tailored mat 18 each minute, a demand of 100 tailored mats during 100 pressing cycles in 100 minutes results. If a cleaning procedure of the tool, which lasts 1 minutes, is interposed every 10 pressing cycles, the provision time of the 100 tailored mats 18 is lengthened to 110 minutes, 10 tailored mats being required in 10 minutes, however, and subsequently no tailored mats being able to be laid in the molding press 20 during the cleaning procedure. Simultaneously, however, the production device 38 is to be able to produce further continuously, because this production process of the resin mats in this configuration cannot be performed cyclically. According to the method according to the invention, the control device 37 adapts the production of the resin mat 10 to the required demand over 100 minutes in such a manner that during the demand of the 10 pressing cycles, the required number of tailored mats 18 is available and during the waiting time for the next possible pressing cycle, no resin mat 10 exits from the thickening device 25. Of course, this is a simplified method description, because the control device 37 must accordingly operate in anticipation of the required manipulating time of the transfer device 19 for the tailored mat and for transferring the tailored mat 18. For these reasons, the facility variant according to FIG. 4 also suggests itself, because in particular here the two areas of resin mat production and thickening device are cleanly separable from one another with respect to control and regulation and are not connected to one another by a continuous belt 2 or 3 and further positioning devices 26', 26" must additionally be incorporated into the control or regulation, respectively.

The control circuit of the entire facility may be described in simplified form as follows: The reference variable consists of the demand per unit of time for required tailored mats for one or more presses, one or more interfering variables being predictable events such as tool change, tool cleaning, maintenance interval for tool, molding press, or transfer device, preferably in the case of multiple possible molding presses having corresponding branching of the transfer device. To compensate for the interfering variables, preferably to adapt the output quantity of the resin mats 10, the length of the transport route X in the thickening device 25 and/or the production speed of the production device 10 are preferably adapted to the required demand and varied. Furthermore, to adapt the output quantity of resin mats 10 from the thickening device 25, the thermal energy to be introduced by the heating device 24 can be adapted to the length of the transport route. Alternatively, of course, optional heating devices can also be incorporated in the thickening device 25, for example, in the support tables 35 and/or the deflection rolls 30. A macroscopic observation of the control device 37 is found in the description of FIG. 7.

FIG. 5 shows a part in detail of a further possible thickening device 25 consisting of multiple belt tablets 28, which are arranged as movable horizontally by means of a positioning device 29 and/or vertically individually or as a whole by means of a suitable positioning device 33 to set the transport route X. The positioning device 29, of course, can also or only additionally be capable of varying the length of the belt tablets 28. For assistance, the transfer device of the resin mat 10 into the thickening device 25, implemented by an optional conveyor belt on a deflection roll or (not shown) on a single deflection roll, can be arranged as movable, preferably vertically movable, by means of a positioning device 27. For example, the present embodiment would also be suitable for the purpose, after a targeted production interruption of the films, of laying the resin mat 10 on a different number of belt tablets 28, in the present case only two belt tablets 28 being actively turned on to transport the resin mat 10 through the thickening area C. Alternatively, of course, the mat can also pass through all belt tablets 28 and can be set through the horizontal displacement of the belt tablets 28, which each have an independent revolving belt or other conveyance means (multiple roller arrangement, stepping mechanism, vibration means, or the like). The shortest transport route would accordingly result in the event of only slight engagement of the belt tablets 28 with the resin mat 10, in that the resin mat 10 is laid quasi-directly on the last conveyor belt. The longest transport route results if the transport tablets are moved by means of the positioning devices 29 so that the entire area of the resin mat can be laid and transported thereon. For the extreme setting, the belt tablets 28 can even be moved opposite to one another enough that the resin mat 10 hangs freely until it is supported on the respective next belt tablet 28. The possible small and compact construction of the overall facility is also shown here, especially the thickening device 25 having a settable transport route.

FIG. 6 shows a similar arrangement principle of preferably rather thin resin mats 10, the variable transport route X in the thickening area C being formed in the thickening device 10 using a plurality of adjustable deflection rolls. The shortest transport route, corresponding to the thickening area C, is formed if the deflection rolls 30, implemented in this figure as drive rollers 34 having a drive device (not shown), are arranged by the positioning devices 26 in such a manner that the resin mat 10 extends in the straightest possible line from the entry point 32 up to the exit point 23, preferably performed by the draw-off roller pair 31. This arrangement is shown in the left area, in the case of the extended transport route X according to the drawing shown therein, the drive rollers 34 would stand at the location of the deflection rolls 30' indicated by dashed lines. However, at least a type of flexing movement is performed in the thickening area, so that the deflection rolls 30 or the drive rollers 34, respectively, would stand similarly as in the milling and impregnation section and would ensure a certain continuous tension of the films on the resin mat 10 and flexing of the resin mat 10.

If needed, one drive roller 34 after another can be moved into the resin mat 10, so that an extension of the transport route X in the thickening area C results through the movement of the drive rollers 34.

Finally, FIG. 7 shows a very macroscopic and schematic illustration of a control and/or regulating device having a minimum-required linkage of the individual facility parts to execute a conceivable method for operating such a facility. At least one control device 37 is operationally linked with respect to control and/or regulation to at least one of the following facility parts: a molding press 20, a transfer device 19, a thickening device 25, and a production device 38 for preparing an endless resin mat 10. With respect to control and regulation concepts, it is to be noted that the control devices preferably consist of a programmable universal computer, which, through special interfaces with the individual facility parts through suitable control technology and measuring sensors for feedback of actual values and for comparison to target values, must perform the tasks of control and regulation alternately or simultaneously, in particular depending on the facility part to which the control or regulating line is connected. To illustrate the control of the preferred manipulated variable, the transport route X, it is only connected using a single arrow to the thickening device 25, which does not preclude feedback about the status via sensors and corresponding regulation for the precise setting of the transport route X being provided or considered necessary. In the schematic view, the relationship of the production device 38 for the resin mats 10, which consists of the mixing device 1 and the milling and impregnation device 14, can also be seen, the resin mat preferably being transferred smoothly into the thickening device 25 to the variable transport route X, matured therein, and subsequently being transferred to the transfer device 19 for transport of the prepared tailored mat into the corresponding molding press 20, 20', 20" . . . .

LIST OF REFERENCE SIGNS: DP 1395

1 mixing device
2 top belt
3 bottom belt
4 lower squeegee
5 resin formulation layer
6 fibers
7 upper squeegee
8 resin formulation layer
9 resin formulation
10 resin mat
11 bottom rollers
12
13 top rollers
14 milling and impregnation device
15 film draw-off
16 cutter strip
17 cutting mechanism
18 tailored mat
19 transfer device
20 molding press
21 molded part
22 deflection roll
23 exit point
24 heating device
25 thickening device
26 positioning device
27 positioning device
28 belt tablet
29 positioning device
30 deflection rolls
31 draw-off roller pair
32 entry point
33 positioning device
34 drive rollers
35 support table
36 film winder
37 control device
38 production device for 10
A resin formulation application section
B milling and impregnation section
C thickening section
W heat introduction section
X transport route (FIG. 7)

The invention claimed is:

1. A facility for a continuous production of fiber-reinforced resin mats in the course of a production of fiber-reinforced molded parts via extrusion in a molding press, the facility comprising:
 at least one endless revolving belt,
 a production device configured for producing resin mats, the production device comprising a mixing device configured for bringing together at least one resin formulation and fibers, and a milling and impregnation device configured for mixing the fibers with the at least one resin formulation to form a resin mat,
 a thickening device configured for maturing the resin mat, wherein a transport route comprises a route between an entry point of the resin mat into the thickening device and an exit point of the resin mat from the thickening device,
 a cutting mechanism configured for cutting the resin mat to length to form a tailored mat,
 a transfer device for subsequent transfer of at least one tailored mat into the molding press, and
 at least one positioning device arranged outside of the thickening device and configured to tension the at least one endless revolving belt,
 wherein the thickening device comprises
  at least one positioning device arranged inside of the thickening device, the at least one positioning device configured to vary the transport route between the entry point and the exit point, at least two deflection rolls arranged in at least parts of the transport route, at least one deflection roll configured to vary in its distance from another deflection roll via the at least one positioning device, at least one belt tablet arranged in at least parts of the transport route, the at least one belt tablet configured to be varied in its length by a first belt positioning device and/or in its location by a second belt positioning device, and a support table arranged in at least parts of the transport route, the support table configured to be varied in its length and/or its location by a support table positioning device.

2. The facility according to claim 1, wherein, between the milling and impregnation device and the exit point, at least one heating device is arranged in a production direction before the entry point and/or in the thickening device.

3. A method for operating the facility according to claim 1, the method comprising:

bringing at least one resin formulation together with fibers in a mixing section of a production device for resin mats, forming a resin mat in a milling and impregnation section of the production device by mixing the fibers with the at least one resin formulation, transferring the resin mat via a transport route through a thickening device and maturing the resin mat, after exiting the thickening device, cutting the resin mat via a cutting mechanism to form tailored mats, transferring at least one tailored mat via a transfer device into at least one molding press, and compressing the at least one tailored mat in the molding press to form a molded part, wherein an output quantity of the resin mats is adapted to a required demand of the molding compound by at least one control device, which is operationally linked with respect to control and/or regulation to at least one molding press, at least one transfer device, a thickening device, and a production device for preparing an endless resin mat.

4. The method according to claim 3, wherein, to adapt the output quantity of the resin mats, a length of the transport route in the thickening device and/or a production speed is adapted and varied to the required demand.

5. The method according to claim 3, further comprising introducing heat energy by a heating device, wherein the heat energy to be introduced by the heating device is adapted based on a length of the transport route for the adaptation of the output quantity of resin mats from the thickening device.

6. The facility according to claim 1, further comprising supply means configured to supply the at least one resin formulation to the at least one endless revolving belt.

7. The facility according to claim 1, wherein the support table is configured to be telescoped by the support table positioning device.

8. The facility according to claim 1, wherein the heating device comprises a microwave device.

9. The facility according to claim 1, further comprising supply means configured to supply the at least one resin formulation to the at least one endless revolving belt.

10. The facility according to claim 1, wherein the at least one endless revolving belt is configured to guide the resin mat via the deflection rolls through the facility.

11. The facility according to claim 1, wherein the resin mat is guided via the deflection rolls, always pressing against the at least one endless revolving belt, through the thickening device for maturing.

12. The facility according to claim 1, wherein the at least one positioning device arranged outside of the thickening device is configured to tension the at least one endless revolving belt to maintain the at least one endless revolving belt in a tensioned state when a length of the transport route has been varied due to a change in a distance between deflection rolls.

13. The facility according to claim 1, wherein a side of the support table that contacts the resin mat has a low-friction surface.

14. The facility according to claim 1, further comprising a draw-off roller pair configured to hold the resin mat under tension in a thickening area of the facility and support a film winder.

15. The facility according to claim 1, wherein the support table, the deflection rolls or a combination thereof are heated.

16. The facility according to claim 1, wherein the deflection rolls are driven.

17. The facility according to claim 1, further comprising a transfer positioning device configured to move the resin mat when the resin mat is being transferred into the thickening device.

18. A use of the facility according to claim 1 to produce resin mats with a plurality of molding presses, varying tools with respect to volume and/or time, or highly reactive resin formulations.

19. Using the method according to claim 8 to produce resin mats with a plurality of molding presses, varying tools with respect to volume and/or time, or highly reactive resin formulations.

* * * * *